(12) United States Patent
Davies et al.

(10) Patent No.: US 11,190,567 B2
(45) Date of Patent: *Nov. 30, 2021

(54) LOW-LATENCY HTTP LIVE STREAMING

(71) Applicant: Twitter, Inc., San Francisco, CA (US)

(72) Inventors: Geraint John Davies, Bodorgan (GB); Mark Kalman, San Francisco, CA (US)

(73) Assignee: Twitter, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/781,342

(22) Filed: Feb. 4, 2020

(65) Prior Publication Data

US 2020/0177657 A1    Jun. 4, 2020

Related U.S. Application Data

(63) Continuation of application No. 15/654,494, filed on Jul. 19, 2017, now Pat. No. 10,567,461.

(Continued)

(51) Int. Cl.
*G06F 15/16* (2006.01)
*H04L 29/06* (2006.01)
(Continued)

(52) U.S. Cl.
CPC ............ *H04L 65/605* (2013.01); *H04L 65/00* (2013.01); *H04L 65/4076* (2013.01);
(Continued)

(58) Field of Classification Search
CPC ... H04L 65/605; H04L 65/00; H04L 67/2842; H04L 65/602; H04L 65/4076;
(Continued)

(56) References Cited

U.S. PATENT DOCUMENTS 6,119,154 A    9/2000   Weaver et al.
6,141,353 A   10/2000   Li
(Continued)

FOREIGN PATENT DOCUMENTS

GN    105379209 A    3/2016
WO    2006031462 A1   3/2006

OTHER PUBLICATIONS

U.S. Appl. No. 15/654,494, filed Jul. 19, 2017, Allowed.
(Continued)

*Primary Examiner* — Thuong Nguyen
(74) *Attorney, Agent, or Firm* — Brake Hughes Bellermann LLP

(57) ABSTRACT

Implementations provide low-latency live-video streams using existing content delivery networks. An example method includes receiving a video broadcast as a series of frames and determining, for each frame, whether the frame is a break frame. Responsive to determining that the frame is a break frame, the method includes removing an in-progress tag from a current segment file in a playlist for the video broadcast. The playlist includes at least a previous segment file, the current segment file, and a next segment file, which also has a respective in-progress tag. The method also includes associating the frame with a next segment file in a playlist and transmitting the playlist to a cache server. Responsive to determining the frame in the series of frames is not a break frame, the method includes associating the frame with the current segment file. The frame is transmitted to the cache server as a chunk.

13 Claims, 8 Drawing Sheets

Related U.S. Application Data

(60) Provisional application No. 62/371,092, filed on Aug. 1, 2016.

(51) Int. Cl.

| | | |
|---|---|---|
| *H04N 21/4402* | (2011.01) | |
| *H04N 21/845* | (2011.01) | |
| *H04N 21/2183* | (2011.01) | |
| *H04N 21/231* | (2011.01) | |
| *H04L 29/08* | (2006.01) | |
| *H04N 21/442* | (2011.01) | |
| *H04N 21/61* | (2011.01) | |
| H04N 21/6373 | (2011.01) | |
| H04N 21/643 | (2011.01) | |
| H04N 21/6437 | (2011.01) | |

(52) U.S. Cl.
CPC ......... *H04L 65/602* (2013.01); *H04L 65/607* (2013.01); *H04L 67/2842* (2013.01); *H04N 21/2183* (2013.01); *H04N 21/23106* (2013.01); *H04N 21/442* (2013.01); *H04N 21/44029* (2013.01); *H04N 21/6125* (2013.01); *H04N 21/845* (2013.01); *H04N 21/8456* (2013.01); *H04L 67/02* (2013.01); *H04L 67/025* (2013.01); *H04N 21/6373* (2013.01); *H04N 21/6437* (2013.01); *H04N 21/64322* (2013.01)

(58) Field of Classification Search
CPC ..... H04L 65/607; H04L 67/02; H04L 67/025; H04N 21/44029; H04N 21/845; H04N 21/2183; H04N 21/23106; H04N 21/442; H04N 21/6125; H04N 21/8456; H04N 21/6373; H04N 21/64322; H04N 21/6437
USPC ............... 709/203, 231, 219, 233; 370/260; 348/43
See application file for complete search history.

(56) References Cited

U.S. PATENT DOCUMENTS

| | | | |
|---|---|---|---|
| 9,483,837 B2 | 11/2016 | Xu et al. | |
| 10,567,461 B2* | 2/2020 | Davies | H04N 21/44029 |
| 2003/0163810 A1 | 8/2003 | Iijima et al. | |
| 2003/0212993 A1* | 11/2003 | Obrador | H04N 21/4117 |
| | | | 725/9 |
| 2004/0175046 A1 | 9/2004 | Gormish | |
| 2005/0060714 A1 | 3/2005 | Jia et al. | |
| 2006/0233245 A1* | 10/2006 | Chou | H04N 19/61 |
| | | | 375/240.12 |
| 2009/0006488 A1 | 1/2009 | Lindahl et al. | |
| 2009/0089822 A1 | 4/2009 | Wada | |
| 2009/0157731 A1 | 6/2009 | Zigler et al. | |
| 2009/0323809 A1* | 12/2009 | Raveendran | H04N 19/107 |
| | | | 375/240.16 |
| 2010/0022250 A1 | 1/2010 | Petrovic et al. | |
| 2010/0131671 A1* | 5/2010 | Kohli | H04N 21/2407 |
| | | | 709/233 |
| 2010/0322112 A1* | 12/2010 | Toren | H04N 7/152 |
| | | | 370/260 |
| 2011/0238789 A1* | 9/2011 | Luby | H04L 65/604 |
| | | | 709/219 |
| 2012/0004960 A1* | 1/2012 | Ma | H04L 69/16 |
| | | | 705/14.4 |
| 2012/0023254 A1* | 1/2012 | Park | H04L 47/30 |
| | | | 709/231 |
| 2012/0117042 A1 | 5/2012 | Durante et al. | |
| 2012/0195368 A1* | 8/2012 | Chien | H04N 19/895 |
| | | | 375/240.02 |
| 2012/0246462 A1* | 9/2012 | Moroney | H04L 63/10 |
| | | | 713/151 |
| 2013/0147914 A1* | 6/2013 | Park | H04N 13/194 |
| | | | 348/43 |
| 2013/0304916 A1* | 11/2013 | Hodapp | H04L 67/02 |
| | | | 709/224 |
| 2014/0115477 A1* | 4/2014 | Pendergast | G06F 3/04842 |
| | | | 715/723 |
| 2015/0106841 A1* | 4/2015 | Wolf | H04N 21/8455 |
| | | | 725/32 |
| 2015/0134680 A1 | 5/2015 | Silberstein et al. | |
| 2015/0229685 A1 | 8/2015 | Brebion et al. | |
| 2015/0262338 A1 | 9/2015 | Xu et al. | |
| 2015/0334153 A1 | 11/2015 | Koster et al. | |
| 2016/0198012 A1* | 7/2016 | Fablet | H04L 67/26 |
| | | | 709/231 |
| 2016/0232538 A1* | 8/2016 | Papakostas | G06F 16/48 |
| 2018/0158469 A1 | 6/2018 | Zhao | |
| 2020/0177657 A1* | 6/2020 | Davies | H04N 21/23106 |

OTHER PUBLICATIONS

International Search Report and Written Opinion for International Application No. PCT/US2017/045437, dated Oct. 2, 2017, 17 pages.

Fielding, et al., "Hypertext Transfer Protocol—HTTP/1.1", RFC 2616, Network Working Group, Standards Track, Jun. 1999, 177 pages.

Pantos, et al., "HTTP Live Streaming; draft-pantos-http-live-streaming-19.txt", HTTP Live Streaming, Apr. 4, 2016, pp. 1-54.

First Office Action with partial English translation for Chinese Application No. 201780047979.X, dated Aug. 27, 2020, 12 pages.

Extended European Search Report for European Application No. 21162995.1, dated May 11, 2021, 12 pages.

Bouzakaria, et al., "Overhead and Performance of Low Latency Live Streaming using MPEG-DASH", IISA 2014, The 5th International Conference on Information, Intelligence, Systems and Applications, IEEE, Jul. 7, 2014, pp. 92-97, XP032629757.

* cited by examiner

```
                                                        ┌─ 166
    ┌─────────────────────────────────────────────┐
    │ #EXTM3U                                     │
    │ #EXT-X-VERSION <number>                     │
    │ #EXT-X-TARGETDURATION 4                     │
    │ #EXT-X-MEDIA-SEQUENCE:1275                  │
    │                                  ┌─ 220     │
    │ #EXTINF:03,                                 │
205─┤ http://www.example.com/seg1275.m3u8         │
    │ #EXTINF:03,                                 │
205─┤ http://www.example.com/seg1276.m3u8         │
    │ #EXTINF:03,                                 │
205─┤ http://www.example.com/seg1277.m3u8         │
    └─────────────────────────────────────────────┘
```

```
                                                        ┌─ 164
    ┌─────────────────────────────────────────────┐
    │ #EXTM3U                                     │
    │ #EXT-X-VERSION <number>                     │
    │ #EXT-X-TARGETDURATION 4                     │
215─┤ #EXT-X-DISCONTINUITY-SEQUENCE:7             │
    │ #EXT-X-MEDIA-SEQUENCE:1275                  │
    │                                  ┌─ 225     │
    │ #EXTINF:03.3014,                            │
    │ http://www.example.com/seg1275.m3u8         │
210─┤ #EXT-X-DISCONTINUITY                        │
    │ #EXTINF:02.0098,                            │
    │ http://www.example.com/seg1276.m3u8         │
    │ #EXTINF:03.0169,─────────────────── 225     │
    │ http://www.example.com/seg1277.m3u8         │
    └─────────────────────────────────────────────┘
```

FIG. 2a

```
                                                              166'
┌─────────────────────────────────────────────────────────┐
│ #EXTM3U                                                 │
│ #EXT-X-VERSION <number>                                 │
│ #EXT-X-TARGETDURATION 4                                 │
│ #EXT-X-MEDIA-SEQUENCE:1275          230                 │
│                                                         │
│ #EXT-X-PROGRAM-DATE-TIME 2017-07-13T15:54:43.42+08:00   │
│ #EXTINF:03,                                             │
│ http://www.example.com/seg1275.m3u8                     │
│ #EXT-X-PROGRAM-DATE-TIME 2017-07-13T15:54:46.18+08:00   │
│ #EXT-IN-PROGRESS                                        │
│ #EXTINF:03,                                             │
│ http://www.example.com/seg1276.m3u8                     │
│ #EXT-X-PROGRAM-DATE-TIME 2017-07-13T15:54:49.03+08:00   │
│ #EXT-IN-PROGRESS                                        │
│ #EXTINF:03,                                             │
│ http://www.example.com/seg1277.m3u8                     │
│ #EXT-X-PROGRAM-DATE-TIME 2017-07-13T15:54:49.03+08:00   │
│ #EXT-IN-PROGRESS                                        │
│ #EXTINF:03,                                             │
│ http://www.example.com/seg1278.m3u8                     │
└─────────────────────────────────────────────────────────┘
```

Labels: 220 → #EXTINF:03, (first); 205 → http://www.example.com/seg1275.m3u8, seg1276.m3u8, seg1277.m3u8; 235 → #EXT-IN-PROGRESS

FIG. 2b

LOW-LATENCY HTTP LIVE STREAMING

RELATED APPLICATIONS

This application is a continuation of, and claims priority to, U.S. application Ser. No. 15/654,494, filed on Jul. 19, 2017, titled "Low-Latency HTTP Live Streaming," which is a non-provisional of, and claims priority to, U.S. Provisional Application No. 62/371,092, filed on Aug. 4, 2016, titled "Low-Latency HTTP Live Streaming," the disclosures of which are incorporated herein by reference.

BACKGROUND

Content providers deliver media content to viewers. Some such content providers offer live-streamed media, which is provided in real time or near real-time. Content providers typically choose to distribute the live-streamed media via a persistent connection or via HTTP/HTTPS (Hypertext Transfer Protocol)/(HTTP Secure). A persistent connection protocol, such as a Real-Time Messaging Protocol (RTMP), delivers live-streamed media to the viewer, one frame at a time over a connection that persists for the duration of the stream. Such direct delivery allows a low latency, e.g., around 2 seconds. Latency is the time between when the content is produced at the broadcast device and when the viewing device plays the content. But providing persistent connections for a large number of viewers (e.g., hundreds) is expensive and thus cost-prohibitive. Delivering live-streamed media via HTTP can be done using the HTTP Live Stream protocol (HLS), which breaks a live video stream into a playlist of very short files that are distributed and cached using standard content delivery networks (CDNs) or a similar caching service. Distribution via a content delivery network does not limit viewers, but HTTP-based streaming protocols that segment the stream into short files increase the latency. In the case of HLS, for example, latency is usually around 9-10 seconds.

SUMMARY

Disclosed implementations provide a low-latency cost-efficient solution for live-streaming media. Implementations include a low-latency HTTP live-streamed protocol, also referred to as LHLS, that transmits a live-streamed media file one frame at a time using chunked HTTP transfers and a modified HLS playlist file. Using the protocol disclosed herein, a live-stream media file can be provided with about a 2 second latency using content delivery networks, which enables delivery to virtually an unlimited number of viewers. Such low latency times enable any number of viewers of a live-streamed video broadcast to provide a closed feedback loop, in which engagements from viewers are provided to the broadcaster and to other viewers in real time or near real time. For example, a viewer may comment on the broadcast, may signal approval for specific moments in the broadcast, may invite other social media users to join the broadcast, etc. Because of the low latency (e.g., two seconds or less), such engagements can be provided back to the viewers and the broadcaster within a latency period suitable to allow the broadcaster to react to and interact with the viewers.

In some implementations, the live-stream video server may transmit each frame of a live video stream using chunked HTTP transfers to a caching server (e.g., the content delivery network). The caching server then provides the frames, also using chunked HTTP transfers, to the viewers. In a chunked HTTP transfer a file is transferred using HTTP, but in a number of separate transfers, without the total duration of the file being known in advance. Each chunk (frame) is associated with a file, also referred to as a segment file, and the entire live-streamed media broadcast may be made up of a series of segment files. Each segment file may represent an approximate period of time, e.g., three seconds of video. But the exact duration of any segment file is not known in advance of frames in the segment being transmitted to the cache server. Rather the duration of each particular segment file is determined once a break frame is identified in the video stream. A break frame may represent a key frame received after some interval of time, e.g., three seconds, so that each segment file, once all the frames have been received, is approximately three seconds long. A break frame may also represent a discontinuity, which changes the video properties of the live-streamed broadcast. For example, a discontinuity may occur when the broadcaster switches from a camera phone to a drone camera, or when the video quality of the broadcast changes due to bandwidth available to the broadcaster. Generating segment files in this manner allows the video server to provide the broadcast in an LHLS format as well as an HLS format, as the segment files once completed can be added to an HLS playlist. This enables viewers who do not have an LHLS viewer to participate in the broadcast, although such viewers may not be able to participate in the closed feedback loop due to the increased latency.

A low-latency playlist file enables the transfer of frames in the live video stream via chunked HTTP transfers. The benefit of using chunked transfer coding is that it eliminates the segmentation delay normally associated with HTTP-based streaming. In HLS live streaming, for instance, the succession of media frames arriving from the broadcaster is normally aggregated into segments each a few seconds long. Only when a segment is completed can a URL for the segment be added to a live media playlist. The latency issue is that by the time a segment is completed, the first frame in the segment is as old as the segment duration. While this "segmentation latency" can be reduced by reducing the size of the segment, this would reduce video coding efficiency, assuming each segment starts with an I-frame, because I-frames are typically many times larger than predicted frames. By using chunked transfer coding, on the other hand, a segment's URL can be added to the media playlist before the segment is completed. The client can request the yet-to-be completed segment and begin receiving the segment's frames as soon as the server receives them from the broadcaster.

The low-latency playlist is similar to the playlist used in the HLS protocol, but with distinctions that support chunked HTTP transfers. First, the low latency playlist cannot include markers for discontinuities because the discontinuities are not known when the playlist is generated or updated. Thus, the live-stream video server identifies the discontinuities, begins a new segment file when a discontinuity is encountered, and provides the video properties in the video stream. Additionally, the playlist needs to identify at least two segment files. While frames being transferred (e.g., to the content servers and from the content servers to the viewers) will generally be associated with the first segment file identified in the playlist, the other segment files must exist with limited header data written to them to ensure that the viewer can request the file and play the live-streamed video broadcast uninterrupted. However, an accurate length of the segment files cannot be included in the playlist because the length is not known at the time the files are generated with the header data.

DESCRIPTION OF THE DRAWINGS

FIG. 2a is an example of a playlist for a low-latency HTTP live-streamed protocol, according to an implementation.

FIG. 2b is another example of a playlist for a low-latency HTTP live-streamed protocol, according to an implementation.

DETAILED DESCRIPTION

Figure 1:
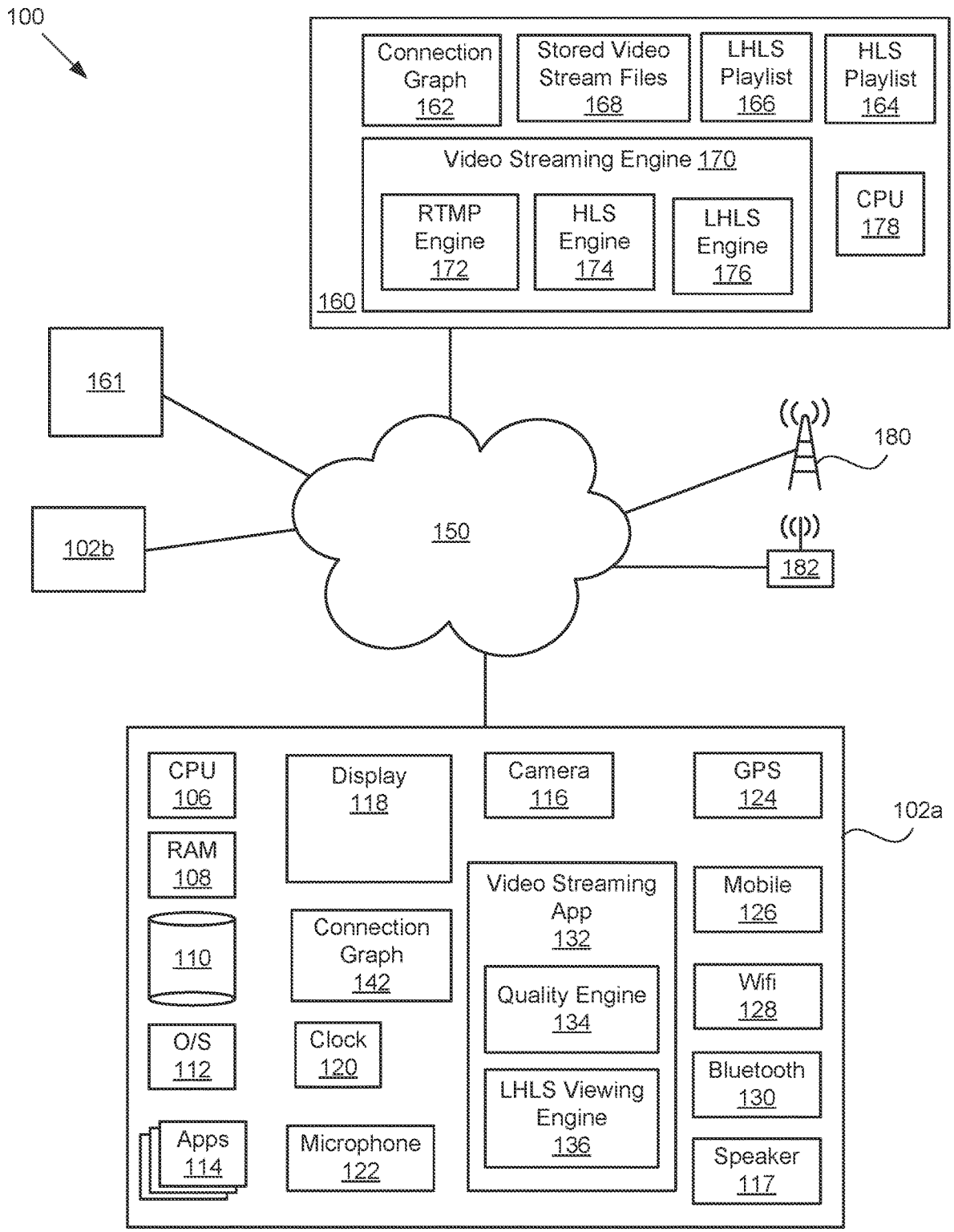
FIG. 1 is a schematic diagram of a low-latency live-streamed broadcast using chunked HTTP transfers, according to an implementation.

FIG. 1 is a schematic diagram of a system 100 for supporting a low-latency HTTP live-streamed broadcast. System 100 can include one or more client devices 102, e.g., 102a, 102b, connected to one or more streaming server computers 160 through one or more networks 150. The client devices 102 may be both viewing devices and broadcasting devices, as the video streaming application 132 supports both functions. The client devices 102 are consumer computing devices and can be a mobile computing device (e.g., a smart phone, a PDA, a tablet, a wearable device, such as a wrist or head mounted device, a virtual reality device, or a laptop computer) or a non-mobile personal computing device (e.g., a desktop computing device, internet-enabled television or entertainment system). The client device 102 can include one or more processors 106 (e.g., a processor formed in a substrate, such as a central processing unit, a graphics processor, etc.), a volatile memory 108, and nonvolatile memory 110. In various implementations, the volatile memory 108 may store, for example, instructions that are executed by the processor(s) 106, and the nonvolatile memory 110 may store, for example, various user data, instructions for executing an operating system, applications, etc. While FIG. 1 illustrates client device 102a in more detail than client device 102b, it is understood that client device 102b includes similar components. It is also understood that while the system of FIG. 1 is discussed in terms of a live-streamed video broadcast system for ease of discussion, disclosed implementations are not so limited and can be applied to any streaming media system.

The computing device 102 can include an operating system 112 and a plurality of applications 114, which can be executed by the computing device 102 (e.g., by the processor 106 executing one or more instructions stored in memory 108 or 110 that correspond to the application) and which may communicate with the operating system (e.g., through one or more application programming interfaces (APIs)). Execution of the applications 114 can provide various functionalities to a user of the computing device 102. In a few examples, an email application may, with a user's permission, provide access to the user's email account and email messages associated with the account. A browser application may provide a Web browser to a user, so that the user may access content that can be loaded into, and displayed by, the browser application. A social network application can provide content to the user from contacts and sources that the user has chosen to be associated with within the social media platform associated with the social network application. A camera application can provide access to a camera 116 within the computing device 102 for capturing still pictures or video. In some implementations, the camera 116 may be external to the computing device 102, such as a camera that communicates wirelessly, e.g., via BLUETOOTH or Wi-Fi, with the computing device 102. Applications that provide a rich variety of other functionalities and information to the user also can be provided. In some implementations, the video streaming application 132 may be considered one of the applications 114.

The computing device 102 includes a display 118 (e.g., a touchscreen display, an LED display, etc.) that can display a user interface for an application 114 that is being executed by the device. More than one application can be executed at a time. However, in some implementations (e.g., in the case of a smart phone), the duration of the display is better suited for a single executing application to be displayed at a time. The executing application that is displayed on the display 118 can be referred to as a "front-facing" application.

The computing device 102 can include internal speakers 117 that can provide an audio output from the device. The computing device 102 also can include a port (not shown) that can be used to connect the computing device to external devices, e.g., speakers that may provide an audio output when connected to the device 102. The computing device 102 may also include a microphone 122 that detects sound in the environment of the device. In some implementations, the microphone 122 may be external to the computing device 102. The microphone 122, whether internal or external, may provide audio for a live video stream.

The computing device also includes a clock 120 that determines a time and date and may include a GPS transceiver 124 that communicates with a global positioning system to determine a location of the computing device 102. The location may be provided as part of the metadata associated with a real-time video stream. The computing device 102 also includes various network interface circuitry, such as for example, a mobile network interface 126 through which the computing device can communicate with a cellular network, a Wi-Fi network interface 128 with which the computing device can communicate with a Wi-Fi base station 182, a BLUETOOTH network interface 130 with which the computing device can communicate with other BLUETOOTH devices (e.g., an external camera, microphone, or speakers), and/or an Ethernet connection or other wired connection that enables the computing device 102 to access network 150. The computing device 102 may include other sensors (not shown), such as, for example, an ambient light sensor, a temperature sensor, an accelerometer, etc.

A video streaming application 132 may be configured to enable a user of the computing device 102 to start a real-time video stream. In some implementations, the real-time video stream may be shared via a social media platform. A video stream is live or real-time when the source of the video stream is a video capture device rather than storage media. The video capture device may be a camera (e.g., camera 116) in communication with the computing device 102, e.g., a camera on a drone or a helmet-mounted camera that communicates with the computing device 102, e.g., via BLUETOOTH interface 130 or Wi-Fi interface 128. The video streaming application 132 may be a mobile application, or may be a web-based application. The video streaming application 132 may be configured to enable the user to select a privacy setting for the real-time video stream. The privacy setting controls the potential audience for the broadcast (e.g., viewable by anyone, or something more restrictive).

After receiving a request from the user who wants to begin a broadcast, the video streaming application 132 may be configured to use various components of the computing device 102 or components in communication with computing device 102 to capture and send a real-time video stream and to display interactions (e.g., engagement representations) from viewers of the real-time video stream. For example, the video streaming application 132 may use the camera 116, the GPS 124, and the microphone 122 of the computing device 102 to capture a real-time video stream with audio. In some implementations, the GPS 124 may associate a location with the real-time video stream. In some implementations, the video streaming application 132 may include a quality engine 134, which may be configured to determine the throughput between the device 102 and the server 160 via networks 150. The throughput represents the bandwidth available to transmit the real-time video stream from device 102 to the server 160. When bandwidth is low the quality engine 134 is configured to reduce the video quality sent to the server 160. This differs from conventional streaming systems because the broadcasting video streaming application 132 decides the highest video quality available to viewers based on the bandwidth available to the broadcasting device 102. The video streaming application 132 may be configured to provide the live video stream to the content server, e.g., server 160, one frame at a time. Reducing the video quality or increasing the video quality of the frames in the video broadcast provided to the server 160 represents a discontinuity in the real-time video stream.

The video streaming application 132 is configured to provide the real-time video stream from the broadcasting computing device 102 to a content server, such as server 160. The content server may also be referred to as a video streaming server. The server 160 may be a single computing device, or may be a representation of two or more distributed computing communicatively connected to share workload and resources. In some implementations, the server 160 is a social media platform server. The server 160 may also include one or more processors 178 formed in a substrate configured to execute instructions. The instructions may be stored in memory, such as RAM, flash, cache, disk, tape, etc. In addition, the server 160 may include one or more data stores configured to 1 store data in a persisting manner. For example, the server 160 may store a connection graph 162. The connection graph 162 may be a data structure representing relationships (i.e., connections) between one or more entities. For example, the connection graph 162 may be a data set that tracks relationships between social media accounts. Relationships can include friending, following, liking, linking, or some other relationship. In some implementations the connection graph 162 may represent entities that have installed a video streaming application 132 and set up a user account through the interactive streaming application.

In some implementations, the connection graph 162 may represent entities from more than one social media platform or entities that have installed various social media applications. Thus, the connection graph 162 may be understood to represent multiple distinct data sources, each representing a separate set of entities and relationships for separate social media platforms. In some implementations, a first user account in one data store may include an identifier for a second user account in a second data store, where the first user account and the second user account correspond to a single human user. Thus, the video streaming engine 170 may be able to access the second data store via the link between the first user account and the second user account. The system may thus access a second social media platform via such connected accounts. The human user may have control over such connections.

The server 160 may also include a video streaming engine 170. In some implementations, the video streaming engine 170 may service a social media platform, and thus, have access to the connection graph 162 for the social media platform. But the video streaming engine 170 need not be connected to, or service, a social media platform. The video streaming engine 170 may be configured to receive a request to start a real-time video stream from a broadcasting computing device 102. Upon receiving the request, the video streaming engine 170 may assign a video stream identifier and an audio stream identifier to be used to identify the live-streamed video broadcast received for the request. The video streaming engine 170 may also generate LHLS playlist 166 for the live-streamed content. The LHLS playlist 166 includes at least two segment files. Each segment file includes limited header data but no video frames at the time it is created. Because the segment files initially lack any associated video frames, the segment files are considered to lack content when generated. This differs from an HLS protocol, where the segment files must be generated with content. The header data is the same for each of the segment files and includes a table header that identifies the audio stream identifier and the video stream identifier. In some implementations, the first byte of the table header is a stream index. The header contents are specified by the mpeg2 transport stream standard. It consists of mpeg2 transport stream packets containing the PMT and PAT as specified in ISO/IEC 13818-1:2013(E). The header is the first chunk sent to the client when the client requests the segment file. As frames of media associated with the segment become available, the server sends them to the client as subsequent chunks. The segment files are included in stored video stream files 168. In some implementations, the video streaming engine 170 may include a low-latency HLS engine 176 that generates the LHLS playlist 166 and the segment files.

Once the broadcaster starts the live-streamed video broadcast, the video streaming engine 170 may begin receiving video frames for the broadcast. When a video frame is received, the video streaming engine 170 may determine whether the video frame is a break frame. A break frame represents a frame that should be written as the first frame in another segment file. A break frame may represent a discontinuity that changes the video properties of the live-streamed video broadcast. A break frame can also represent a time-based interval reached in the broadcast. For example, the video streaming engine 170 may be configured to store segment files of a target duration, e.g., three seconds, five seconds, ten seconds, etc. The time-based interval represents the target duration. As video frames are received, the video streaming engine 170 associates each frame with a segment file, e.g., the current segment file. This current segment file is the first file listed in the LHLS playlist 166. Once the video streaming engine 170 associates enough frames with a segment file to reach the target duration, the video streaming engine 170 may look for the next key frame. A key frame is a full frame of data. In some implementations, the broadcasting device 102*a* may write a full frame of data at regular intervals and the frames that follow the key frame may include only data that changes from the previous frames. In this manner, some implementations may compress the data in the live-streamed video broadcast. The interval at which key frames occur is independent of the target time, or in other words the time-based interval used to determine the end of a segment file. When the next key frame is encountered after the time-based interval has been reached, that key frame is a break frame.

When the video streaming engine 170 encounters a break frame, it closes the current segment file, sends an end-of-file indication for the current segment file, creates a new segment file, and updates the LHLS playlist 166 by removing the current segment file and adding the new segment file to the end of the playlist 166. The video streaming engine 170 associates the break frame with the new current segment file (the one that is the first segment file in the updated playlist 166), adds video information to the break frame, and starts associating frames received from the broadcasting device 102 with this new current segment file. When the playlist 166 is updated the video streaming engine 170 may transmit the updated LHLS playlist 166 to caching servers 161, e.g., servers in a content delivery network (CDN). The caching servers 161 are any servers configured to provide files to viewing devices, e.g., device 102*b*, using HTTP transfers. The video streaming engine 170 may transmit the frames to the caching servers 161 as chunked HTTP transfers. In other words, the video streaming engine 170 may transmit the frames as they are received rather than writing the frames to a segment file and then transmitting the segment file as a whole to the caching servers 161.

In some implementations, the video streaming engine 170 may also include a HLS engine 174 and/or an RTMP engine 172. The HLS engine 174 and the RTMP Engine 172 are optional. The RTMP engine 172 may provide the live video stream obtained from the broadcaster to one or more viewers via a persistent connection, e.g., using the RTMP protocol, or a protocol similar to it. The HLS engine 174 may generate an HLS playlist 164 and provide the HLS playlist 164 to the caching servers 161. The HLS playlist 164 may identify one or more of the segment files generated by the LHLS Engine 176. In other words, the HLS playlist 164 and the LHLS playlist 166 may use the same segment files. The difference is that the LHLS playlist 166 identifies the segment files when the segment files are not yet complete (e.g., additional frames can be added to the segment files), where the HLS playlist 164 identifies segment files that are complete, e.g., no additional frames will be added to the files. In an LHLS playlist 166 at least some of the segment files identified will not have any content (e.g., frames) associated with them yet. Thus, the LHLS playlist 166 cannot include an accurate duration of the segment files, whereas the duration of each segment file in the HLS playlist 164 is required.

In some implementations, the video streaming engine 170 may be configured to receive engagements from the client viewing devices (e.g., device 102*b*) and provide engagement indications with the video stream provided to the various client devices. The video streaming engine 170 may also provide the engagement indications to the broadcasting device (e.g., device 102*a*). The engagement may be associated with a particular time in the real-time video stream. For example, an engagement may be associated with the time represented by a timestamp packet associated with the video frame displayed when the engagement was received. An engagement is some type of interaction from one of the viewers. For example, a signal of appreciation is a type of engagement where a viewer expresses approval at a particular moment during the real-time video stream. The moment in time may be represented by the time in a timestamp packet associated with the frame that was being displayed when the engagement was received by the client device. Another example of an engagement is a comment provided by a viewer. Another example is a share, which may have a corresponding share notification telling other viewers and the broadcaster that a viewer has invited other viewers. The video streaming engine 170 may provide indications of the engagements with the video stream to encourage interaction among the viewers and broadcaster. In some implementations, the video streaming engine 170 may aggregate the different types of engagements, generating statistics for the broadcast.

The server 160 may store the stored video stream files 168 for a limited time (for example 12 or 24 hours). For example, when a broadcaster completes a real-time broadcast, the broadcaster may choose to make the video stream available for replay. Accordingly, the server 160 may store the video stream in stored video stream files 168. In some implementations, the server 160 may store all the segment files generated for LHLS (and possibly HLS) transfer as video stream files 168, and make the entire series of segment files available for replay. For example, the segment files for a particular live video stream may be identified in a playlist, e.g., an extended M3U playlist, for that live video stream. Extended M3U playlists are also used in the HLS protocol. Extended M3U playlists and the HLS protocol are described in the Internet-Draft for HTTP Live Streaming available at https://tools.ietforg/html/draft-pantos-http-live-streaming-19, which is incorporated herein by reference.

The system 100 may also include caching servers 161. Caching servers 161 represent servers in a content delivery network and provide file transfers to client devices 102 over a network 150, such as the Internet. The server 160 may provide the LHLS playlist 166 and the HLS playlist to the caching servers over a network 150, which makes the playlists available to viewing devices. The server 160 also transmits the frames of a live-streamed broadcast to the caching servers 161 via chunked HTTP transfer and the caching servers 161 may in turn provide the frames to viewing devices 102 via chunked HTTP transfer. It is understood that the frames of a particular segment file may be provided to the viewing device 102 prior to the server 160 receiving a break frame for the segment file, which defines the end of the segment file. This is different from the server 160 providing an entire segment file to the caching servers 161 under HLS, which cannot be done until all of the frames for the segment file have been received at the server 160. Moreover, the viewing device 102 must receive the entire segment file from the caching server 161 under HLS before it can start playing the frames in the segment. Thus, with a segment file duration of three seconds, the latency under HLS is about 10 seconds. In contrast, because frames transmitted using LHLS can be sent to the caching servers 161 and then to the viewing device 102 as soon as they are received, the frames arrive much faster to the viewing device 102 via chunked HTTP transfer using the LHLS protocol and the latency is around two seconds.

The video streaming application 132 of consumer computing device 102 may be configured with a viewing user interface, or playback operation, that enables a potential viewer to receive a notification about a live video stream, join the stream, and provide feedback in the form of comments or signals of appreciation. For example, the video streaming application 132 may include LHLS viewing engine 136. In an implementation, once the viewer selects a live-video stream to view, the video streaming application 132 of the computing device 102 may be configured to download the LHLS playlist for that stream and begin to receive the live video stream via chunked HTTP transfers from the caching server 161. For example, the video streaming application 132 may be configured to download the LHLS playlist 166 periodically, e.g., every second, to determine if the playlist 166 for the live-video stream has changed. The period at which the video streaming application 132 downloads the playlist 166 should be shorter than the estimated duration of the segment files to ensure that playback occurs uninterrupted. For example, some segment files may be much shorter than anticipated due to a discontinuity. When the LHLS playlist 166 changes, the playback operation of the video streaming application 132 may request the new segment file as soon as it appears in the playlist 166. However, data is not placed in the decode pipeline for this segment file until receiving an indication that the content of the previous segment is complete. Because the duration of a segment file is not known in the LHLS protocol, the playback operation of the video streaming application 132 may look for an end-of-file (EOF) marker for each segment. When an EOF marker is received, the video streaming application 132 may start to decode and render content from the next segment file in the playlist. The EOF marker may be received as a last HTTP chunk in the transfer of a segment file. Once a broadcaster ends a broadcast, the last chunk of the last segment may include an end-of-broadcast marker. When the video streaming application 132 receives an end-of-broadcast marker it may stop the playback. The end-of-broadcast marker is part of the content of the last segment and is part of the H.264 video specification.

In some implementations, the video streaming application 132 or the applications 114 may also be configured to receive the live video stream via the HLS protocol. A LHLS viewer, e.g., using the chunked HTTP transfers to view the live-streamed video broadcast, may provide a latency time much lower than a viewer using the HLS protocol. Thus, in some implementations, the video streaming application 132 may enable engagements when using LHLS to view the live-streamed video but disable the engagements when using HLS.

FIG. 2a is a diagram of an HLS playlist 164 and an LHLS playlist 166. The example LHLS playlist 166 includes three segment files 205. At least some of the segments that appear in the LHLS playlist 166 appear in the playlist before they are complete on the server. In the example of FIG. 2a, segment file 205 identified as seg1276.m3u8 represents a discontinuity from segment file 205 identified as seg1275.m3u8. In other words, seg1276.m3u8 has different video properties than seg1275.m3u8. In a conventional HLS playlist, such as HLS playlist 164, such a discontinuity must be identified with a discontinuity tag 210. In the example of FIG. 2a, the HLS playlist 164 represents a playlist file generated after the content associated with each of the segment files is received. Thus, for example, in a system that generates both an LHLS playlist 166 and an HLS playlist for the same segment files, HLS playlist 164 is generated later in time than LHLS playlist 166. For example, LHLS playlist 166 may be generated before or when a first frame is first associated with segment file seg1275 while HLS playlist 164 may be generated after the last frame of seg1277 is received and added to the segment file. Thus it is understood that the LHLS playlist 166 represents an earlier moment in time (e.g., 5 to 10 seconds before) than HLS playlist 164. The difference in the moment in time is needed to show how the LHLS playlist 166 differs from the playlist 164 for the same frames.

In addition to including tag 215, which marks discontinuities between segment files, the sequence of the discontinuity must be identified in the HLS playlist 164 using the discontinuity sequence tag 215. In contrast, the LHLS playlist 166 lacks markers for discontinuities because it is not known in advance, e.g., when the segment files are added to the playlist, when the discontinuity will occur. This is because, as explained above, at least some of the segment files 205 in the LHLS playlist 166 are placeholders only and the LHLS playlist 166 is written before content (e.g., frames) associated with the segments are available.

In addition to the lack of discontinuity markers, the LHLS playlist 166 lacks an accurate duration of the segment file and may lack any duration at all. A target duration 220 may be provided, but the final duration of the segment file is unknown when the segment file is added to the HLS playlist 166. The final duration of the segment file may be much shorter or longer than the target duration 220. Thus it is understood that the target duration 220 is an approximation only and, in some implementations, is optional. In contrast, the HLS playlist 164 includes an actual duration 225, which represents the length of the segment in seconds. It is preferred that the actual duration 225 is a floating point number to increase the accuracy of the duration. Indeed, the duration 225 must be close to the actual duration of the segment file for the HLS protocol to work.

FIG. 2b is a diagram of another LHLS playlist 166'. The example LHLS playlist 166' includes the same three segment files 205 of LHLS playlist 166 of FIG. 2a, with an additional segment file (seg1278.m3u8) and represents a later time in the broadcast, i.e., after seg1275.m3u8 has been fully written. Playlist 166' illustrates optional tags that may be included in the LHLS playlist. For example, the date-time tag 230 records the absolute clock time that the segment 205 was created. This tag can also be included in the HLS playlist 164 and is part of the HLS protocol. The in-progress tag 235 is unique to LHLS playlists, and indicates segments that are in-progress, or not fully written. These tags may be included in an LHLS playlist to reduce initial latency by enabling the player, rather than the server, to decide which segment in the playlist to start playing when the player joins.

The time it takes to fill the playback buffer to a desired playback start threshold (time-to-first-frame), the ultimate playback buffer size, and consequently the latency due to buffering all depend on exactly how far through a segment file the broadcast is at the moment the player joins. The client's playback buffer allows playback to be uninterrupted when the delivery of data is variable because of network jitter, but also increases latency. Thus, there is a tradeoff between higher latency and fewer stalls in a poor network setting.

For time-to-first-frame, for most players, the broadcast is encoded at a bitrate well below the player's download bandwidth, because the broadcaster's upload bandwidth is usually much lower than the player's download bandwidth.

This means a player, if starting with older segments that are already fully written, can be download at full download speed. It also means that if the player starts with the frame that is currently being encoded, the player fills the playback buffer at real time, as it is created. Accordingly, when the player starts with older segments already written, the player can fill a 2 second buffer in less than half a second, whereas filling the playback buffer at real time takes the full 2 seconds.

With HLS playlist 164 and LHLS playlist 166, the player begins at the start of the first file. Starting at the beginning of the playlist means that the server that creates the playlist (e.g., server 160) decides the length of the playback buffer and the time-to-first-frame. In contrast, LHLS playlist 166' includes the additional tags 230 and 235 that enable the player to decide the length of the playback buffer and the time-to-first frame dynamically, based on local network conditions at the player.

To provide the information needed by the player to determine the playback buffer and time-to-first-frame dynamically, in some implementations, the playlist 166' is longer, e.g., includes more than three entries. The last two entries (e.g., segment file 205 identified as seg1278.m3u8 and segment file 205 identified as seg1277.m3u8) have only the PAT/PMT header, e.g., are the placeholder entries. The one before that—the propenultimate entry (e.g., segment file 205 identified as seg1276.m3u8) is the that is currently being written to. Any entries before this entry are fully written and can be downloaded immediately into the player's download buffer at the download bandwidth. The player may use heuristics about the network conditions to decide how large of playback buffer to use and then use the date-time tags 230 and the in-progress tags 235 to decide which segment in the playlist to start playing. In some implementations, the player may calculate the playback buffer duration using one or more of: 1) recent measurements of frame arrival jitter from the broadcaster to the server, 2) frame arrival jitter from server to client for the current broadcast, and 3) a constant that ensures a minimum buffer size. In some implementations, the player may calculate the playback buffer duration using a maximum of broadcaster-to-server jitter, server-to-client jitter, and the minimum buffer size. Server-to-client jitter for the current broadcast is only available when rebuffering after a stall. For the broadcaster-to-server jitter component, the server may record the inter-arrival times of frames from broadcaster and calculate the buffer size that would be needed to absorb arrival gaps over the last 30 seconds. In some implementations, the LHLS playlist 166 may include a custom tag (not shown in FIG. 2*b*) that records the jitter value. In some implementations, the player may also look at whether inter-arrivals at the player have been consistent over some period.

Figure 3:
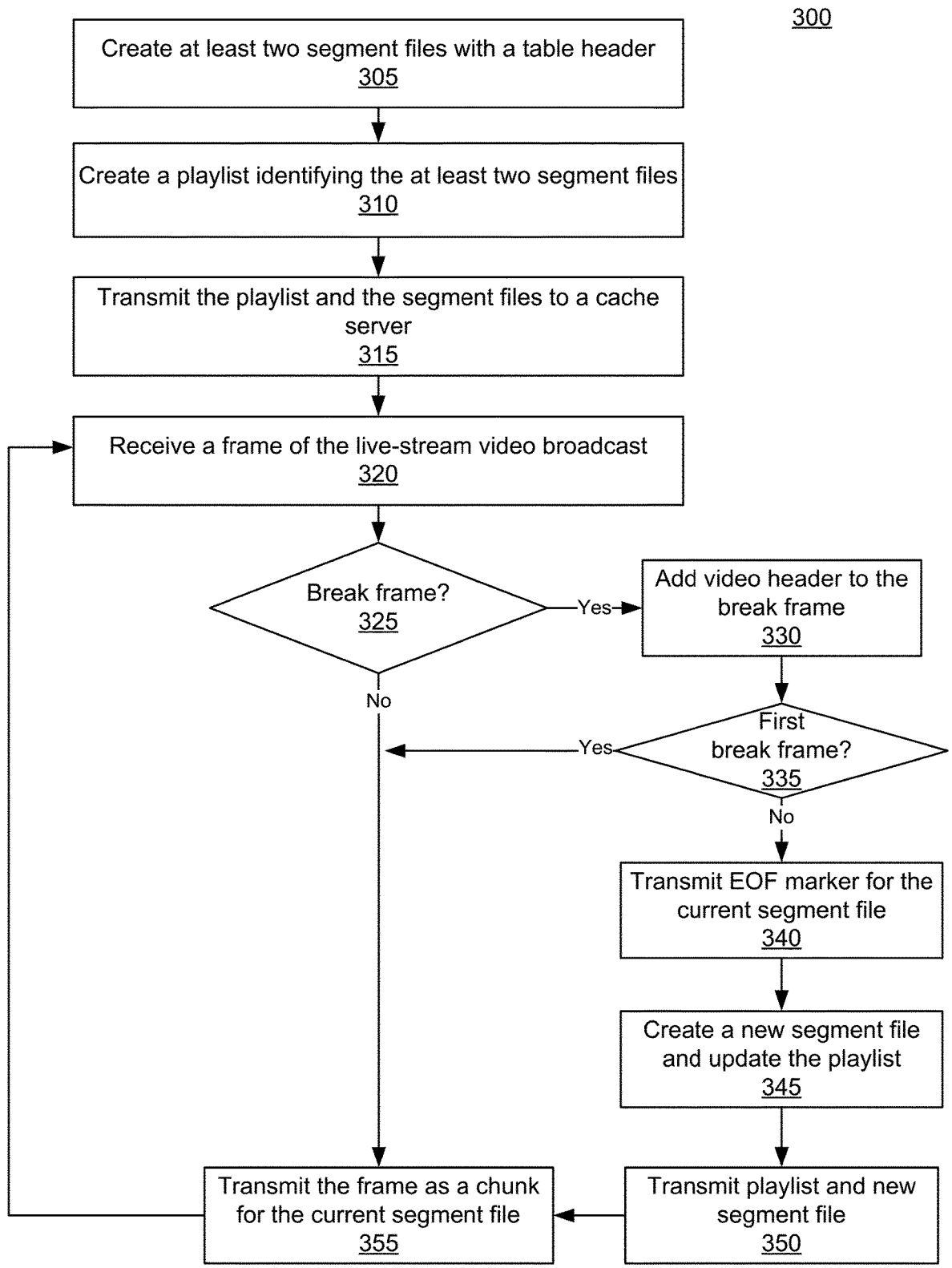
FIG. 3 is a flow chart of an example method depicting example operations of a content server that provides a low-latency HTTP live-streamed protocol, according to an implementation.

FIG. 3 is a flow chart illustrating a process 300 depicting example operations of a content server that provides a HTTP-based low-latency live-streamed media broadcast, according to an implementation. The example operations may be executed as part of a system that includes a media streaming engine, such as video streaming engine 170 of FIG. 1. In some implementations, the media streaming engine may include an LHLS engine as well as an HLS engine, and other components, as explained with reference to the server 160 of FIG. 1. The example process 300 is described with respect to a single live-streamed media broadcast but the media streaming engine may be capable of handling a plurality of such live-streams at a single time. Thus it is understood that the media streaming engine may be performing process 300 concurrently for any number of live-streamed media broadcasts. Process 300 is described as a video broadcast for convenience, but implementations include live audio broadcasts as well.

Process 300 begins by creating at least two segment files (305). The system may create the segment files in response to receiving a request to begin a live-streamed video broadcast. The system may create the segment files with header information, e.g., a table header that includes an identifier for the audio stream and an identifier for the video stream but without content. These identifiers may be generated by the system responsive to the request to start a live-streamed video. Thus the header information is the same for each segment file for this live-streamed video but differs between different streams. The system may also create a playlist identifying the at least two segment files (310). The playlist may include a target time or duration for each of the two segment files. The target duration is an approximate duration, as the actual segment file may be much shorter or much longer than the approximate duration. For example, the target duration may be three seconds, but once content is associated with the segment file, the segment file may be only 1.25 seconds long because of a discontinuity or may be 4.5 seconds long because of when a next key frame after the three seconds is encountered. Thus, the target duration in the playlist is not an approximation. The playlist 166 of FIG. 2*a* and playlist 166' of FIG. 2*b* are examples of the playlist.

The system may transmit the playlist and the at least two segment files to a cache server (315). The cache server may be a server in a content delivery network. A content delivery network is a system of distributed servers that deliver content, e.g., web pages and other files, to a user, usually over the Internet. One or more (or all) of the segment files transmitted to the cache server have no content, or in other words no frames from the live-streamed video, yet associated with it. At this point these files are placeholders generated only with the header data. The header data allows a player (e.g., a viewing device such as device 102*b* of FIG. 1) to request the download of the file, so that once content is associated with the file it may be transferred via HTTP chunks.

The system may begin receiving frames from the live-streamed video broadcast (320) one at a time. For each frame received, the system may determine if the frame is a break frame (325). A break frame can be a discontinuity or a key frame that occurs after the target time is reached. A key frame is a full frame of data. In some implementations, the broadcasting device may write a full frame of data at regular intervals and the frames that follow the key frame may include only data that changes from the previous frames. The interval at which key frames occur is independent of the target time, or in other words the time-based interval used to determine the end of a segment file. Because of this, the segment files may end up being longer than the target duration of the segment file in the playlist. The break frame may also be a discontinuity. A discontinuity is a frame where the properties of the video change. This can occur, for example, if the broadcaster switches input devices, e.g., switching from a phone camera to a drone camera or a helmet-mounted camera. This can also occur if the throughput for the broadcasting device changes, so that the video quality is either better or worse. When such changes in the live-streamed video broadcast occur, the system may detect the discontinuity and may consider the first frame that has the new video properties a break frame.

If the frame is not a break frame (325, No), the system may transmit the frame as a chunk associated with the current segment file (355). The current segment file is the segment file that is listed first in the playlist. Step 355 also associates the frame with the segment file. Thus, for example, the system may write the frame to the segment file that is stored, e.g., at the video streaming server 160. In this manner the system can build segment files that can also be used to transmit the live-streamed video broadcast using HLS. Put another way, after the system is finished associating frames with a segment file, it may transmit the complete segment file and a HLS playlist to the cache server.

If the frame is a break frame (325, Yes), the system may determine whether the break frame is the first break frame encountered for this broadcast (335). If it is the first one (335, Yes), the system may send the frame with the video header as a chunk (355) to the caching server. If the frame is not the first break frame (335, No), the system may transmit an end-of-file (EOF) marker for the current segment file. (340). The EOF marker indicates that the current segment file is complete, or in other words has all the content associated with it. The EOF marker is an indication to the media player that all HTTP chunks for the segment have been received and the player can start to decode and render from the next segment file in the playlist. Without the EOF marker the player does not know to start the download and decode pipeline for the next segment. In implementations where the system provides the live-streamed video broadcast in HLS as well as LHLS, the system may also complete the segment file and create or update an HLS playlist with the completed segment file. The updated HLS playlist and completed segment file may be transmitted to the caching server. Of course the frames associated with this segment file have already been transmitted via chunked HTTP transfer to the cache server under the LHLS protocol. Thus, users who are using LHLS to receive the live-streamed media broadcast have already viewed the frames associated with the segment file before the HLS viewers are able to start downloading the segment file.

The system may also create a new segment file, e.g., create a next segment file and write the header information identifying the live-streamed video broadcast to the new segment file (345). The system may also update the playlist file, removing the current segment file (e.g., the one listed first) and adding the newly created segment file. This means that the current segment file has changed—it is now the file that used to be listed as the second entry in the playlist, but is now the first entry due to removing the previously first-listed segment file. The system may also update the media-sequence tag in the playlist, if included in the playlist. For example, if the playlist originally listed seg1, seg2, and seg3, with seg1 being the current segment file, the updated playlist may identify seg2, seg3, and seg4, with seg2 now being the current segment file and may set the media-sequence tag to 2, indicating that at least one segment has already been deleted from the playlist. The system may then transmit the new playlist and the new segment file to the caching server (350). As indicated earlier, the player running on the viewing device may be configured to download the playlist at regular intervals—thus transmitting the updated playlist makes the update available for download to the viewers, as explained in more detail with regard to FIG. 4.

The system may then transmit the frame as a chunk for the current segment file (355). The system keeps receiving frames for the live-streamed video broadcast (320), transmitting the frames via chunked HTTP transfers, and determining where to break the segment files as described above. Process 300 may end when the system receives an end-of-broadcast indication from the broadcasting device or times-out (e.g., fails to receive a frame for the live-streamed video broadcast within a predetermined time frame). At the end of the broadcast (whether initiated by the broadcaster or by a time out), the system may add an end-of-broadcast marker to the playlist and transmit the updated playlist to the cache server. The system may insert the end-of-broadcast marker in the playlist after the last segment file to have content associated it and may remove any segment files in the playlist that come after the end-of-broadcast marker.

Figure 4:
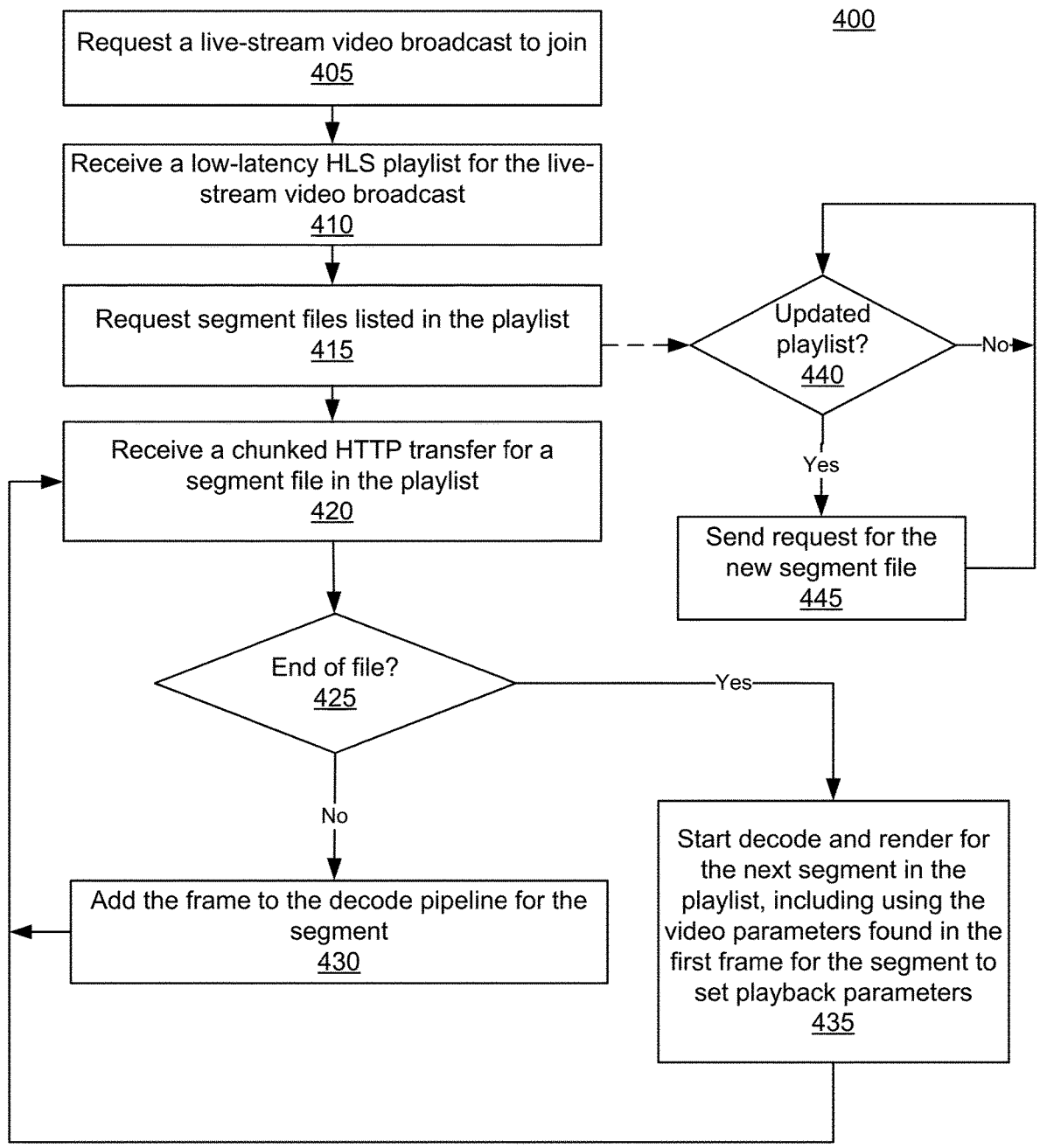
FIG. 4 is a flow chart of an example method depicting example operations of a playback device receiving a low-latency HTTP live-streamed protocol, according to another implementation.

FIG. 4 is a flow chart of an example process 400 depicting example operations of a playback device receiving a low-latency HTTP live-streamed (LHLS) protocol, according to an implementation. Process 400 may be performed by a video streaming application executed on a viewing device of a live-streamed video broadcast system, such as device 102*a* or 102*b* of FIG. 1. Process 400 may enable the viewing device to receive frames of the live-broadcast video stream as chunked HTTP transfers, so that the latency (e.g., time between when the frame is provided by the broadcaster and viewed by the viewer) is low, around two seconds. Chunked HTTP transfers enable the viewing device to potentially begin viewing frames of a segment file even before the last frame is received for the segment file, or in other words before the segment file is complete.

Process 400 begins when a viewing device requests a live-streamed video broadcast to join (405). The viewing device may have been notified about the live-streamed video broadcast by the broadcaster or by someone viewing the broadcast, or may be identified the broadcast from a search interface, etc. The viewing device may receive, in response, a low-latency HLS playlist for the live-streamed video broadcast (410). The playlist may be an example of the playlist 166 of FIG. 2*a* or playlist 166' of FIG. 2*b*. Accordingly, the playlist includes at least one segment file that is a place holder—i.e., the segment file has no video stream content associated with it yet. The playlist may also lack an actual duration for the segment files. Instead, in some implementations, the playlist may have a target duration. The target duration may sometimes be off of the actual final duration of the segment file by 50% or more. Thus, the target duration is not always an approximation of the final duration and need not be close to the final duration. In some implementations, the viewing device may use tags in the playlist to determine the size of the playback buffer and which file to request, as described above with regard to FIG. 2*b*.

The viewing device may then request the segment files listed in the playlist from the caching server (415). A request for the first segment will initially get whatever media has accumulated in the segment by the time the request arrives, but will then get chunks as they arrive at the server from the broadcaster for the remaining duration of the segment. The request for any additional segments receives the segment header, but no additional information until the first segment completes. The caching server may provide the requested files via chunked HTTP transfers. Thus, the viewing device may receive a chunked HTTP transfer for a segment file in the playlist (420). The transfer includes a header indicating which segment file the transfer is for. The viewing device may determine whether the chunk is an end-of-file marker (425). If the chunk is an end-of-file marker (425, Yes), the viewing device may start to decode and render the video stream from the next segment file in the playlist (435). In other words, the end-of-file marker signals to the viewing device that no more chunks will be received for that segment file and the viewing device may begin decoding the next segment file in the playlist. Because discontinuities are not marked in the playlist, the viewing device may be capable of obtaining the video parameters in a first frame of the next segment file and using the video parameters to set playback parameters. For example, the sequence and picture parameter sets (SPS and PPS) in the H.264 video encoding standard appear in the H.264 IDR frame at the beginning of each segment. The H.264 IDR frame is the break frame that begins a new segment file. The video decoder can compare the SPS PPS in an IDR frame with the parameters sets currently in use and, if they have changed, the decoder can reset the parameters as needed. As another example, the video decoder can look for discontinuities in the timestamp sequence, e.g., by checking for a jump in the PCR, which is a timecode in Transport Stream files that will normally monotonically increase. Thus, for example, the viewing device may adjust quality or dimension parameters so that the playback matches the video parameters obtained from the first frame.

If the chunk was not an end-of-file marker (425, No), the viewing device may add the frame to the decode pipeline for the segment file (430). Process 400 may continue, e.g., the viewing device may continue receiving chunked HTTP transfers for the live-streamed video broadcast and putting them in the pipeline, until an end-of-broadcast marker is identified, e.g., in an updated playlist file.

While the viewing device is receiving the chunked HTTP transfers it may also be periodically checking for an updated playlist (440). For example, every second or so the viewing device may send a request for the playlist to the caching server. If the playlist has been updated (440, Yes), the viewing device may send a request for the new segment file (or files) added to the playlist (445). Thus, the viewing device may prepare to receive additional segment files added to the playlist, including setting up a decode queue for the new segment file(s). The viewing device may receive the segment header but no media until the current segment finishes. The benefit of advertising segments in the playlist well before they are available is that it eliminates the issue of playlist latency due to client playlist polling frequency and playlist TTL in CDN caches. If the updated playlist includes an end-of-broadcast message instead of a new segment file, the viewing device may set a flag that will cause process 400 to end at step 435, rather than to start the decode and render of the next segment file.

Figure 6:
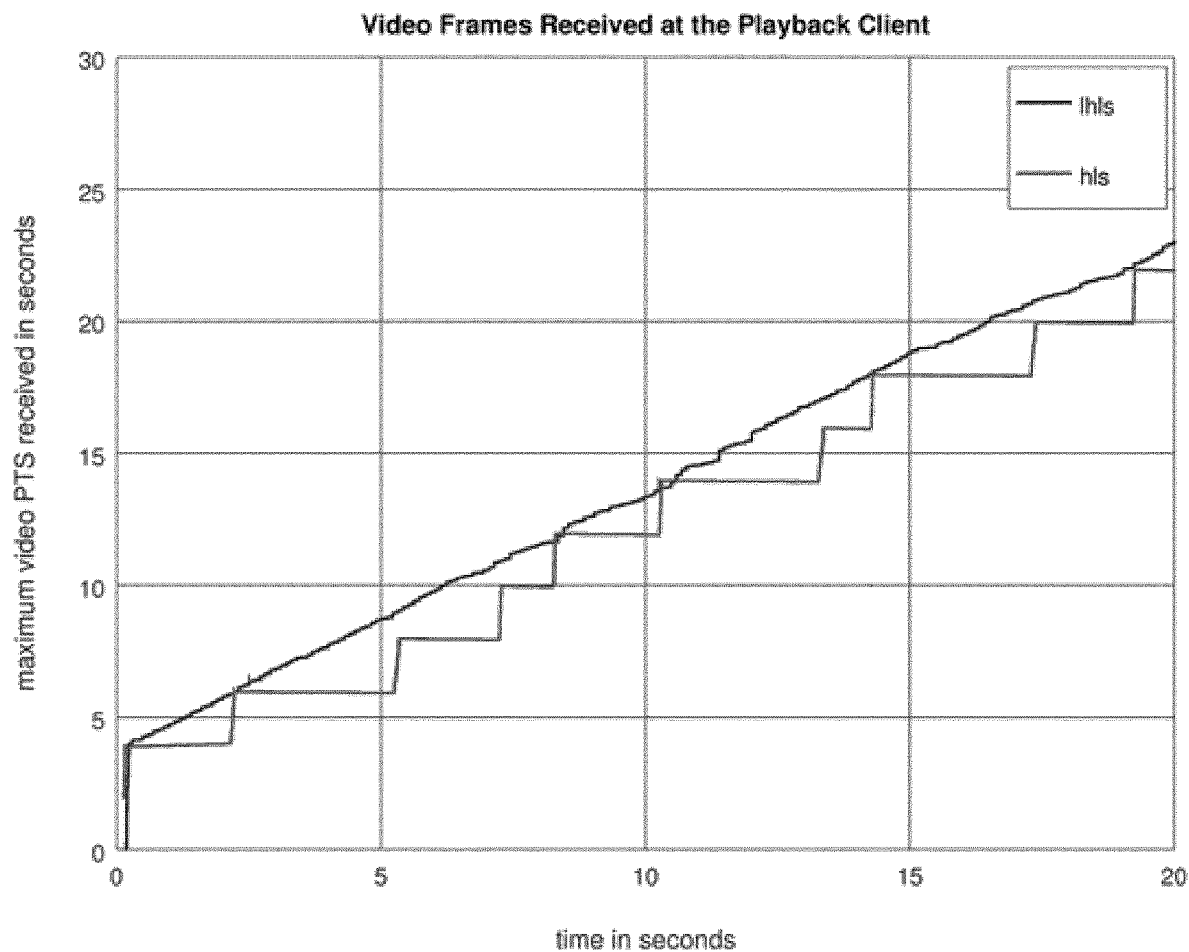
FIG. 6 is a plot comparing video frames received at the viewing device over time for LHLS and HLS.

FIG. 6 is a plot comparing video frames received at the viewing device over time for LHLS and HLS. In the example of FIG. 6, segment duration is fixed at 2 seconds for both LHLS and HLS. For LHLS, frames arrive continuously due to chunk transfer coded responses. Because segments appear in the media playlist well before they are "live", playlist latency due to playlist TTL in CDN caches and the viewing device's playlist polling frequency doesn't interrupt the steady arrival of media. For HLS, in contrast, the viewing device can only request segments after they are completed at the server and after the client receives the updated playlist. Frame arrival is therefore bursty with typically no frames added to the buffer in between periodic segment requests.

Figure 7:
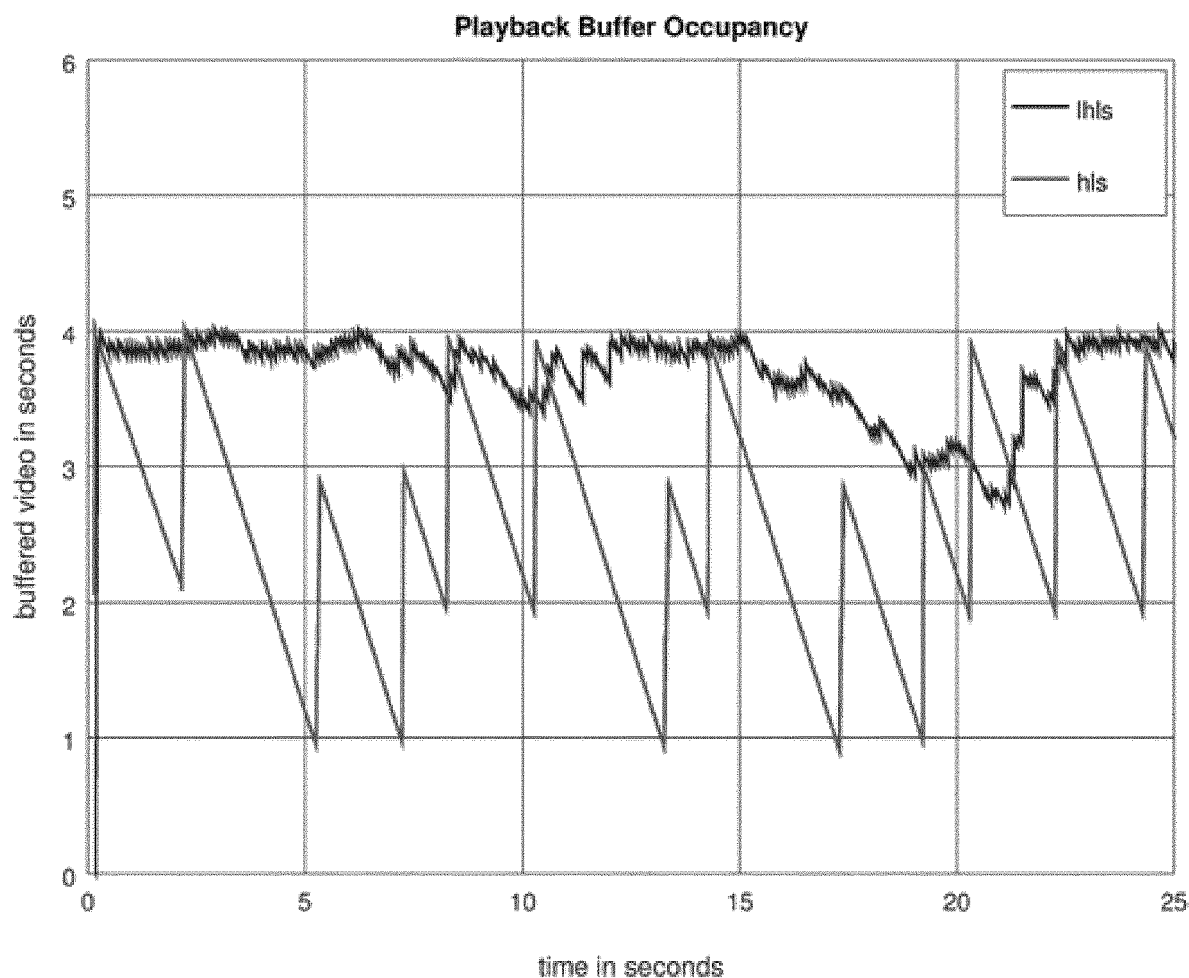
FIG. 7 is a plot comparing playback buffer fullness for LHLS and HLS.

FIG. 7 is a plot comparing playback buffer fullness for LHLS and HLS for the example video arrival traces used in FIG. 6. In the example of FIG. 7, playback begins after 4 seconds of media are buffered for both LHLS and HLS. For HLS, the buffer empties steadily between each bursty arrival of frames. For LHLS, frame arrival is more continuous and the buffer state is more constant. The playback buffer occupancy dips to 2.75 seconds during a bandwidth fluctuation. In comparison, HLS buffer occupancy frequently dips below 1 second.

Figure 5:
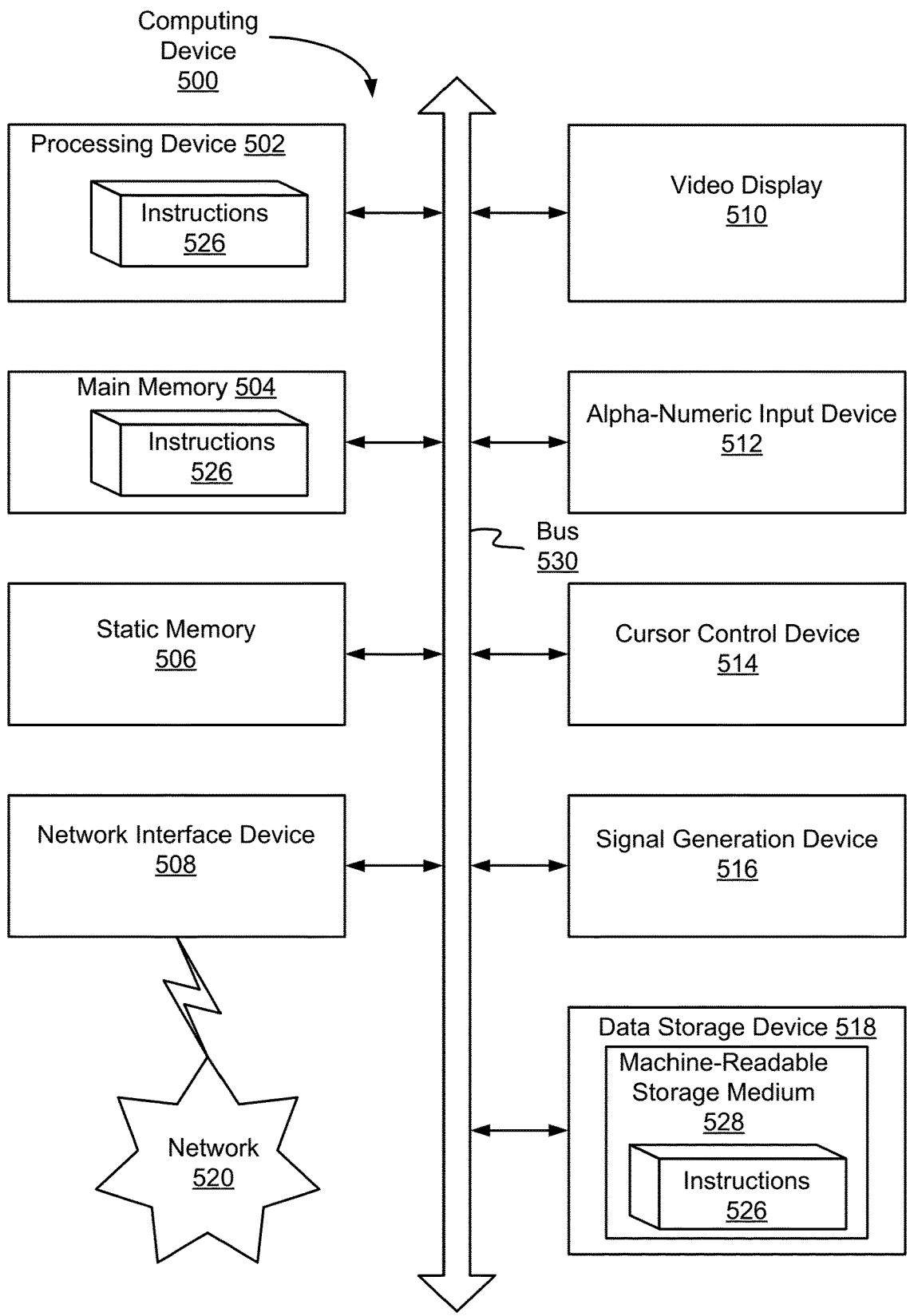
FIG. 5 is a schematic diagram of a machine in the example form of a computing device within which a set of instructions, for causing the machine to perform any one or more of the functions of the interactive video broadcasting service of FIG. 1 according to an implementation.

FIG. 5 illustrates a diagrammatic representation of a machine in the example form of a computing device 500 within which a set of instructions, for causing the machine to perform any one or more of the methodologies discussed herein, may be executed. The computing device 500 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 500 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 500 includes a processing device (e.g., a processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)) and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 (e.g., instructions for an application ranking system) for performing the operations and steps discussed herein.

The computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and a signal generation device 516 (e.g., a speaker). In one implementation, the video display unit 510, the alphanumeric input device 512, and the cursor control device 514 may be combined into a single component or device (e.g., an LCD touch screen).

The data storage device 518 may include a computer-readable storage medium 528 on which is stored one or more sets of instructions 526 (e.g., instructions for the application ranking system) embodying any one or more of the methodologies or functions described herein. The instructions 526 may also reside, completely or at least partially, within the main memory 504 and/or within the processing device 502 during execution thereof by the computing device 500, the main memory 504 and the processing device 502 also constituting computer-readable media. The instructions may further be transmitted or received over a network 520 via the network interface device 508.

While the computer-readable storage medium 528 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

In one aspect, a computing device includes at least one processor and a non-transitory computer-readable medium having executable instructions stored thereon that, when executed by the at least one processor, are configured to execute a low-latency video broadcasting engine. The low-latency video broadcasting engine is configured to write a table header to at least two segment files, the table header identifying a video broadcast stream. Writing the table header to the at least two segment files occurs responsive to a command to start a broadcast. The low-latency video broadcasting engine is also configured to generate a playlist identifying the at least two segment files and generate a video header for a current segment file of the at least two segment files, transmit the playlist and the at least two segment files to a cache server, and begin receiving the video broadcast stream as a series of frames from a broadcast device. Each frame is associated with the current segment file and is transmitted to the cache server as a chunk via a HTTP chunk transfer. Responsive to detecting a break frame, the broadcasting engine is configured to, prior to associating the break frame with the current segment file, transmit a marker indicating and end of the current segment file as a chunk to the cache server, identify a next segment file of the at least two segment files as the new current segment file, and generate a video header for the break frame, so that the video header is transmitted with the break frame to the cache server as a chunk.

In one aspect, a method for generating low-latency video streams using existing content delivery networks can include creating a playlist for a video broadcast stream. The playlist identifies a quantity of segment files, the quantity being at least two, and the content of each of the segment files is a header without media content. The method also includes transmitting the playlist and each of the segment files to a cache server, obtaining the video broadcast stream as a series of frames, and transmitting each frame in the series of frames to the cache server using an HTTP chunk transfer protocol. Each frame is associated with, and written to, a first segment file identified in the playlist.

In one aspect, a method includes receiving a playlist for a video broadcast stream from a caching server, the playlist identifying a quantity of segment files, the quantity being at least two. The method also may include requesting the segment files from the caching server and receiving a chunked HTTP transfer having content, the transfer identifying a segment file from the playlist. The method may also include determining whether the chunked HTTP transfer is an end-of-file message. When the chunked HTTP transfer is not an end-of-file message, the method includes adding the content of the transfer to a decode pipeline for the segment file identified in the transfer, the content representing a frame of the video broadcast stream. When the chunked HTTP transfer is an end-of-file message, the method includes switching to a decode pipeline for a next segment in the playlist. In some implementations, the method also includes determining a playback buffer length based on network jitter and a minimum buffer size. The network jitter may be included as a parameter in the playlist. In some implementations, the break frame may represent one of a discontinuity in the video broadcast stream, a time-based interval reached in the video broadcast stream, or a key frame of the video broadcast stream. In some implementations, the playlist lacks markers for discontinuities between segment files and/or the playlist lacks a duration for the segment files identified in the playlist.

In one aspect, a method generates low-latency video streams using existing content delivery networks. The method includes creating a playlist for a video broadcast stream, the playlist identifying a quantity of segment files, the quantity being at least two, wherein the content of each of the segment files is a table header. The method also includes transmitting the playlist and each of the segment files to a cache server, obtaining the video broadcast stream as a series of frames, and transmitting each frame in the series of frames to the cache server using an HTTP chunk transfer protocol, each frame being associated with, and written to, a first segment file identified in the playlist. In some implementations, responsive to he video broadcast stream being a break frame, the method includes transmitting an end of file marker for the first segment file, and adding a video header for the break frame before it is transmitted.

In one aspect, a computer system includes at least one processor and memory storing instructions that, when executed by the at least one processor, causes the computer system to perform any of the methods described herein.

What is claimed is:

1. A computing device, comprising:
   at least one processor; and
   memory storing instructions that, when executed by the at least one processor, are configured to perform operations including:
      receiving a video broadcast as a series of frames from a broadcast device;
      determining whether a frame in the series of frames is a break frame;
   responsive to determining that the frame in the series of frames is a break frame:
      removing an in-progress tag from a current segment file in a playlist for the video broadcast, the in-progress tag indicating the current segment file is not fully written, the playlist including at least a previous segment file, the current segment file, and a next segment file, wherein the next segment file also has a respective in-progress tag in the playlist,
      associating the frame with a next segment file in the playlist, and
      transmitting the playlist to a cache server;
   responsive to determining the frame in the series of frames is not a break frame, associating the frame with the current segment file; and
   transmitting the frame to the cache server as a chunk,
   wherein each segment file has a respective time tag in the playlist and wherein a receiving device determines a starting segment based on the in-progress tags.

2. The computing device of claim 1, wherein the break frame represents a discontinuance in the video broadcast or a time-based interval reached in the video broadcast.

3. The computing device of claim 1, wherein the time tag is an approximate duration.

4. The computing device of claim 1, wherein responsive to determining the frame is a break frame the operations further include transmitting a marker indicating an end of the current segment file to the cache server as a chunk.

5. The computing device of claim 1, wherein responsive to determining the frame is a break frame the operations further include adding a new segment file to the playlist, the new segment file having a respective in-progress tag.

6. A method comprising:
   receiving a video broadcast as a series of frames; and
   for each frame in the series of frames, associating the frame with a segment file in a playlist for the video broadcast, the playlist including at least a completed segment file, a current segment file, and a next segment file, the current segment file and the next segment file having respective in-progress tags, the in-progress tag indicating its segment is not fully written,
   wherein associating the frame with a segment file includes:
      responsive to determining that the frame is a break frame:
         associating the frame with a next segment file in the playlist, and
         transmitting the frame to a cache server as a chunk; and
      responsive to determining that the frame is not a break frame:
         assigning the frame to the current segment file, and
         transmitting the frame to the cache server as a chunk,
   wherein each segment file has a respective time tag in the playlist, and
   wherein a receiving device determines a starting segment based on the in-progress tags.

7. The method of claim 6, wherein determining that the frame is a break frame includes determining that the frame represents a discontinuity or determining that the break frame is a first key frame after a target time.

8. The method of claim 6, further comprising:
responsive to receiving a request to start the video broadcast, creating the playlist for the video broadcast, the playlist identifying the current segment file and the next segment file, wherein each of the current segment file and the next segment file includes header data; and
transmitting the playlist, the header data for the current segment file, and the header data for the next segment file to the cache server.

9. The method of claim 6, wherein responsive to determining that the frame is a break frame the method further includes:
creating a second next segment file with an in-progress tag; and
adding the second next segment file at an end of the playlist.

10. The method of claim 6, wherein responsive to determining that the frame is a break frame the method further includes removing the respective in-progress tag from the current segment file.

11. The method of claim 6, wherein responsive to determining that the frame is a break frame the method further includes transmitting an end of file marker for the current segment file to the cache server.

12. The method of claim 6, wherein the frame is transmitted as a chunk using HTTP chunk transfer protocol.

13. The method of claim 6, wherein the time tag is an approximate duration.

* * * * *

UNITED STATES PATENT AND TRADEMARK OFFICE
CERTIFICATE OF CORRECTION

PATENT NO. : 11,190,567 B2
APPLICATION NO. : 16/781342
DATED : November 30, 2021
INVENTOR(S) : Davies et al.

It is certified that error appears in the above-identified patent and that said Letters Patent is hereby corrected as shown below:

On the Title Page

On Page 2, Column 1, item (60), under "Related U.S. Application Data", Line 2, delete "1," and insert --4,--, therefore.

Signed and Sealed this
Seventeenth Day of May, 2022

Katherine Kelly Vidal
*Director of the United States Patent and Trademark Office*